United States Patent
Staats

(10) Patent No.: US 6,621,832 B2
(45) Date of Patent: *Sep. 16, 2003

(54) METHOD AND APPARATUS FOR IMPROVING THE ACCURACY OF DATA TRANSMISSIONS IN A SERIAL BUS NETWORK

(75) Inventor: Erik P. Staats, Ben Lomand, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/177,170

(22) Filed: Jun. 20, 2002

(65) Prior Publication Data

US 2002/0172226 A1 Nov. 21, 2002

Related U.S. Application Data

(63) Continuation of application No. 09/027,500, filed on Feb. 20, 1998, now Pat. No. 6,418,150.

(51) Int. Cl.[7] .............................. H04J 3/06; H04L 12/26
(52) U.S. Cl. ...................... 370/503; 370/516; 709/248
(58) Field of Search ................................ 370/503, 516; 709/248

(56) References Cited

U.S. PATENT DOCUMENTS

| 5,751,721 | A | * | 5/1998 | Bloks | 370/509 |
| 5,933,430 | A | * | 8/1999 | Osakabe et al. | 370/395 |
| 5,991,842 | A | * | 11/1999 | Takayama | 710/105 |
| 6,021,505 | A | * | 2/2000 | Ayyagari et al. | 713/502 |
| 6,128,318 | A | * | 10/2000 | Sato | 370/503 |
| 6,373,821 | B2 | * | 4/2002 | Staats | 348/513 |
| 6,418,150 | B1 | * | 7/2002 | Staats | 370/503 |

OTHER PUBLICATIONS

"P1394 Standard For A High Performance Serial Bus", *The Institute of Electrical and Electronic Engineers, Inc., IEEE Standards Department*, P1394 Draft 8.0v3, pp. 1–394 (Oct. 16, 1995).

* cited by examiner

*Primary Examiner*—Melvin Marcelo
(74) *Attorney, Agent, or Firm*—Blakely, Sokoloff, Taylor & Zafman LLP

(57) ABSTRACT

A cycle master in a digital network having a bus architecture that complies with the IEEE-1394 Standard for a High Performance Serial Bus is calibrated by first computing a clock offset representing a difference between a first time synchronized to each of a plurality of packet arrival events and a second time synchronized to periodic ones of said plurality of packet arrival events; and then adjusting a frame rate of said packet arrival events to compensate for said clock offset.

23 Claims, 2 Drawing Sheets

METHOD AND APPARATUS FOR IMPROVING THE ACCURACY OF DATA TRANSMISSIONS IN A SERIAL BUS NETWORK

RELATED APPLICATIONS

This application is a continuation of U.S. patent application Ser. No. 09/027,500, filed Feb. 20, 1998 now U.S. Pat. No. 6,418,150.

This application is related to co-pending Application No. 09/027,499, entitled "Method for Setting Time Stamp in SYT Field of Packet Header for IEEE-1394 Devices", filed Feb. 20, 1998, by Erik P. Staats and assigned to the Assignee of the present invention now U.S. Pat. No. 6,373,821.

FIELD OF THE INVENTION

This invention relates generally to data communications and, more particularly, to a method for controlling isochronous data communications within a digital system having a bus architecture that complies with the IEEE-1394 Standard for a High Performance Serial Bus.

BACKGROUND

The components of a computer or other digital system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled *Standard for a High Performance Serial Bus* (hereinafter "IEEE-1394 Serial Bus Standard"). A typical serial bus having the IEEE-1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE-1394 Serial Bus Standard may be used as an alternate bus for the parallel backplane of a computer system, as a low cost peripheral bus, or as a bus bridge between architecturally compatible buses.

A communications protocol of the IEEE-1394 Serial Bus Standard specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video or audio data. The transactions for each type of bus access are comprised of at least one "subaction", wherein a subaction is a complete one-way transfer operation.

In the case of, for example, digital video data transfers within digital systems conforming to the IEEE-1394 Serial Bus Standard, the video data may be transferred for example, between a mass storage device (e.g., a digital memory such as a hard disk drive, a flash memory device or other storage medium) and a digital video camera or other recorder (e.g., to store an edited video sequence) under the control of a computer processor or other device (e.g., a DMA controller). The video data is transferred as a series of frames, each frame being made up of a number of data packets. The individual data packets include a number header fields (which include various information regarding the data as well as addressing information) as well as the video data itself.

In order to ensure that each frame of the video data is played out in the proper sequence, the frames must be "time stamped" with an appropriate frame presentation time (e.g., measured in terms of "cycle time" of an isochronous transaction on a bus complying with the IEEE-1394 Serial Bus Standard) when they are recorded. The cycle time is maintained by a cycle master as described in the IEEE-1394 Serial Bus Standard. The frame presentation time for individual frames of data is recorded in a particular header field, referred to as an SYT field, of the first packet of each frame. In essence, the frame presentation time "stamped" in the SYT field of the packet header is an indication to the receiver of the time that the frame should be played out. For digital video data, the frame presentation time may be up to 450 $\mu$sec. in the future. That is, from the point of view of the receiver, the SYT field frame presentation stamp value for a given frame of data must be within 450 $\mu$sec. of the time the first packet in that frame is received. Thus, in the example given above, when the digital video data is transferred from the mass storage device to the recording medium, the computer processor or other device which is controlling the transfer must insert appropriate frame presentation time stamp (or SYT) values into the SYT fields of the first packet in each frame of the video data. Note that the 450 $\mu$sec. requirement is specific to video data and other types of data, e.g., MIDI audio data, may have other frame presentation time requirements.

Some cycle master capable devices, e.g., digital video cameras, have been known to have relatively low accuracy cycle times. This presents a problem when such a device is to act as the cycle master. For example, if the accuracy of the cycle master cycle timer falls below an acceptable standard, the time stamps recorded in the SYT fields of packets transmitted within the digital network will be affected. This, in turn, will affect the packet frame rate. If the packet frame rate fails to fall within acceptable limits for the particular type of video data transmission (e.g., an NTSC compatible transmission), color tracking of the video signal may be lost (e.g., at the monitor) and/or other consequences may result. Thus, what is needed is a means to compensate or correct for cycle master cycle timer inaccuracies.

SUMMARY OF THE INVENTION

Methods for controlling isochronous data communications within a digital system having a bus architecture that complies with the IEEE-1394 Standard for a High Performance Serial Bus are described. In one embodiment, a cycle master in a digital network having a bus architecture that complies with the IEEE-1394 Standard for a High Performance Serial Bus is calibrated by first computing a clock offset representing a difference between a first time synchronized to each of a plurality of packet arrival events and a second time synchronized to periodic ones of said plurality of packet arrival events; and then adjusting a frame rate of said packet arrival events to compensate for said clock offset.

Other features and advantages of the present invention will be apparent from the detailed description and accompanying drawings which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
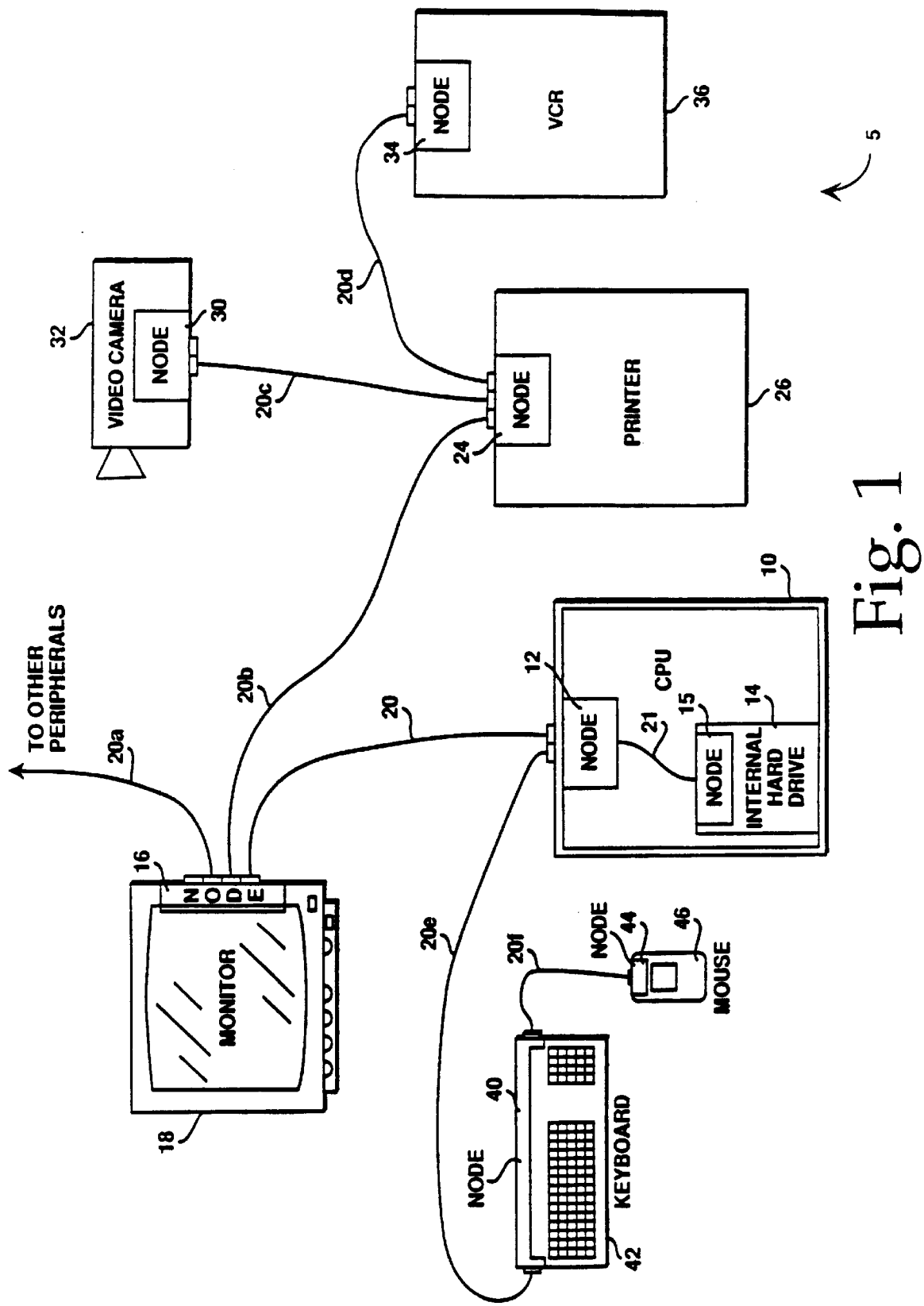
FIG. 1 illustrates a digital system having a serial bus made up of a number of nodes and supporting the control of isochronous data according to one embodiment of the present invention.

As described herein, methods for controlling isochronous data communications within a digital system having a bus architecture that complies with the IEEE-1394 Standard for a High Performance Serial Bus are provided. For example, FIG. 1 shows an exemplary digital system 5 utilizing the methods of the present invention. As will be described in detail below, in one embodiment a cycle master in the digital system 5 is calibrated by first computing a clock offset representing a difference between a first time synchronized to each of a plurality of packet arrival events and a second time synchronized to periodic ones of said plurality of packet arrival events; and then adjusting a frame rate of said packet arrival events to compensate for said clock offset.

Some portions of the detailed description which follows are presented in terms of data structures, algorithms and symbolic representations of operations on data within a computer network and/or a computer memory. These descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical and/or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", or the like, refer to the actions and processes of a computer or other digital system that manipulates and transforms data represented as physical (electronic) quantities within the computer system's registers and memories into other data similarly represented as physical quantities within the computer system memories or registers or other such information storage, transmission or display devices.

The digital system 5 of FIG. 1 includes a central processing unit (CPU) 10, a monitor 18, a printer 26, a video camera 32, a video cassette recorder (VCR) 36, a keyboard 42, and a mouse 46. The CPU 10 includes an internal hard drive 14 and a memory (not shown). Each of the devices of digital system 5 is coupled to a local node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the video camera 32 is the local host for the video camera node 30; the VCR 36 is the local host for the VCR node 34; the keyboard 42 is the local host for the keyboard node 40; the mouse 46 is the local host for the mouse node 44; and the internal hard drive 14 is the local host for the internal hard drive node 15. Those skilled in the art will appreciate that it is not always necessary for every node to have a local host, nor is it necessary that a local host always be powered.

A point-to-point link such as cable 20 is used to connect two nodes to one another. CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of the other peripherals (not shown) by cable 20a and to the printer node 24 by cable 20b. The printer node 24 is coupled to the video camera node 30 by cable 20c and to the VCR node 34 by cable 20d. Each of the cables 20–20f and the internal link 21 may be constructed in accordance with the IEEE-1394 Serial Bus Standard and may include a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of a particular local host. For example, each node may have one or more ports, the number of which is dependent upon its needs. For example, CPU node 12, as illustrated, has 3 ports, while the mouse node 44 has only 1 port.

Digital system 5 supports the transfer of data packets (e.g., made up of digital video and/or audio) associated with a data stream. For example, digital video data from hard drive 14 may be transmitted to video camera 32, e.g., for recording onto digital video tape. Likewise, digital video data may be transmitted from video camera 32 to monitor 18 for display. The video data transmitted to or from video camera 32 will comprise isochronous data packets in accordance with the IEEE-1394 Serial Bus Standard. Each of these isochronous data packets will include header information and payload information. The payload information comprises the video data to be recorded. The header information is used for routing the video data to or from the video camera 32 and for error detection and correction. In addition, and in accordance with one embodiment of the present invention, the header information of the first packet for each frame of the video data includes a presentation time stamp value within an SYT field of the header. The presentation time stamp value is determined according to a computed packet rate for the data, as discussed further below and in co-pending application Ser. No. 09/027,499, entitled "Method for Setting Time Stamp in SYT Field of Packet Header for IEEE-1394 Devices", filed Feb. 20, 1998, by Erik P. Staats, the entire disclosure of which is incorporated by reference herein now U.S. Pat. No. 6,373,821.

The video data is transmitted on a particular isochronous channel within digital system 5. The isochronous channel is identified by a channel identification number (channel ID). The channel ID is maintained in a data record stored in the digital system 5 (e.g., in the memory associated with CPU 10) and is used by the various application programs and driver routines running on CPU 10 to coordinate the transfer of data. The use of a common channel ID allows the interoperation of application programs, driver routines, and other software routines which otherwise may not be capable of operating together.

When video data is to be transmitted, the present invention takes advantage of a feature of currently available hosts designed for use with the IEEE-1394 Serial Bus Standard. Current hosts (and/or their associated nodes) may be programmed to begin transmitting isochronous data on a particular cycle number. The cycle number is determined from the cycle time found in the cycle start packet broadcast by the cycle master on the bus (i.e., the cycle time indicates the cycle number). Each isochronous capable node in the digital system 5 implements a 24.576 MHz clock which runs freely and updates the contents of an associated cycle time register within the node. The cycle time register provides fields that specify the current time value and a write to the cycle time register initializes the clock hardware to the value contained in the write transaction. Non-cycle master nodes in the digital system 5 (so-called cycle slaves) update the value of their cycle time registers based on the time value received in each cycle start packet broadcast by the cycle master. The cycle master arbitrates for control of the bus and transmits a cycle start packet (which includes a cycle time value from cycle master's cycle time register) every 125 µsec.

Thus, according to the present invention, the local host and/or its respective node, associated with the data transmitting device is programmed to begin transmission on a particular isochronous cycle number ("N"). Then, assuming that "M" data packets are to be transmitted for each frame (i.e., M is a computed packet rate for the data) and that "x" represents the frame number, then the frame presentation time value to be stamped in the SYT field of the first packet for each frame of data to be transmitted is given by:

$$SYT[x]=N+Mx+a, \tag{1}$$

where the value "a" is a precomputed offset. In the case of digital video, $$0<a<450 \mu sec.$$

For example, if the transmitter is programmed to begin transmitting frame 0 on cycle 0 (i.e., N=0), then $$SYT[0]=a$$

$$SYT[1]=M+a$$

$$SYT[2]=2M+a \ldots$$

$$SYT[y]=yM+a$$

This SYT value may be precomputed for the data (e.g., using equation (1) above) in advance of the actual data transmission. When the packets are ready for transmission, the appropriate SYT value is written into the SYT field of the first packet (e.g., using conventional techniques for establishing the header of a packet to be transmitted on a bus complying with the IEEE-1394 Serial Bus Standard) for each corresponding frame of data to be transmitted.

The manner in which an appropriate time stamp value for writing into the SYT filed of a packet header may be determined is described in detail in co-pending Application No. 09/027,499, entitled "Method for Setting Time Stamp in SYT Field of Packet Header for IEEE-1394 Devices". For purposes of the present invention, it is sufficient to recognize that the packet rate "M" for any given frame of data may be computed as the difference between the SYT value for the previous frame and that previous frame's corresponding cycle number (i.e., the cycle number at which the first packet of that previous frame was transmitted). In general, a current packet rate (M) is used to compute a current SYT value for a frame as described in co-pending Application No. 09/027, 499. Then, a difference between the current SYT value and the corresponding cycle number for the frame is calculated as a value Δ. Based on the new Δ, a new packet rate is determined. This new packet rate may be used to compute the next SYT value for the next frame, and so on until all the packets have been transmitted.

One consequence of this method is that it relies on the cycle master's cycle timer to maintain accurate time. That is, by using cycle numbers (which are taken from the cycle time transmitted by the cycle master) to compute packet rates for the data, the timing of the transmission of the video data in digital system 5 becomes dependent on the accuracy of the cycle master's cycle timer. Cycle timers are typically required to be accurate to 100 ppm (parts per million), however, it has been noted that not all cycle timers achieve this standard. Thus, for situations where a digital system includes a cycle master having a cycle timer which is less accurate than, say, 100 ppm, the timings of the transmissions of video data (i.e., the video data packet frame rates) within the system may fall outside a required level of accuracy. For example, in the case of NTSC video, if accurate packet frame rates are not maintained, color tracking may be lost and all video may be displayed as black and white.

Although the cycle timers may be inaccurate, however, the cycle times tend to be constant. That is, although the time provided by a cycle timer may only be accurate to, say, −200 ppm, it will tend to be consistently accurate to this degree (i.e., all times provided by this timer will be −200 ppm). Thus, the present invention provides for measuring this inaccuracy and then adjusting the packet frame rate accordingly so that the video data transmitted within digital system 5 is received at the proper frame rate for accurate playback.

As indicated above, each isochronous capable node includes a free running clock which writes times to a cycle time register that is synchronized to the cycle start packets transmitted by the cycle master. So, for a low accuracy cycle master connected to a high accuracy host controller, during a cycle, the cycle time register in the host controller will increment according to its free running clock. However, when a cycle start packet is received from the low accuracy cycle master, there will be an inaccuracy (albeit very slight in most instances) between the time recorded in the cycle start packet and the time recorded in the host controller's cycle time register. Over time, this difference can be measured, in accordance with the present invention, using a new register, called a calibration cycle time register, in the host controller. Such a calibration cycle time register may be implemented in a fashion similar to that for a conventional cycle time register in any or each of nodes 12, 15, 16, 24, 30, 34, 40 and/or 44 of FIG. 1.

The calibration cycle time register is also free running (i.e., it is updated by a free running clock) during an isochronous cycle and is synchronized to a cycle start packet received after a large number of cycles (e.g., 8000 cycles=1 sec). That is, the calibration cycle time register is updated by the host adapter's free running clock for, say, 7999 cycles. Then, at the 8000th cycle, before synchronizing to the time in the cycle start packet received from the cycle master, the cycle clock offset is measured as follows:

cycle clock offset=cycle time register−calibration cycle time register.

The cycle time register of the host adapter has been regularly synchronized to each cycle start packet so, from the cycle clock offset, the accuracy of the cycle master's cycle timer can be computed (e.g., in ppm) and the packet frame rate (M) adjusted accordingly to achieve a desired frame rate ($M_c$), for example as follows:

$$\% \text{ error} = \frac{\text{cycle\_time\_in\_seconds} - \text{calibration\_cycle\_time\_in\_seconds}}{\text{calibration\_period\_in\_seconds}}$$

$M_c$=calibrated_frame_period=$M$+% error·$M$

The clock offset represents a difference between a first time synchronized to each of a number of packet arrival events (i.e., receipt of a number of cycle start packets) and a second time synchronized to periodic ones (e.g., every 8000th one) of the packet arrival events. Of course, this calibration technique assumes that the cycle timer on the host adapter is more accurate than the cycle master's cycle timer.

Figure 2:
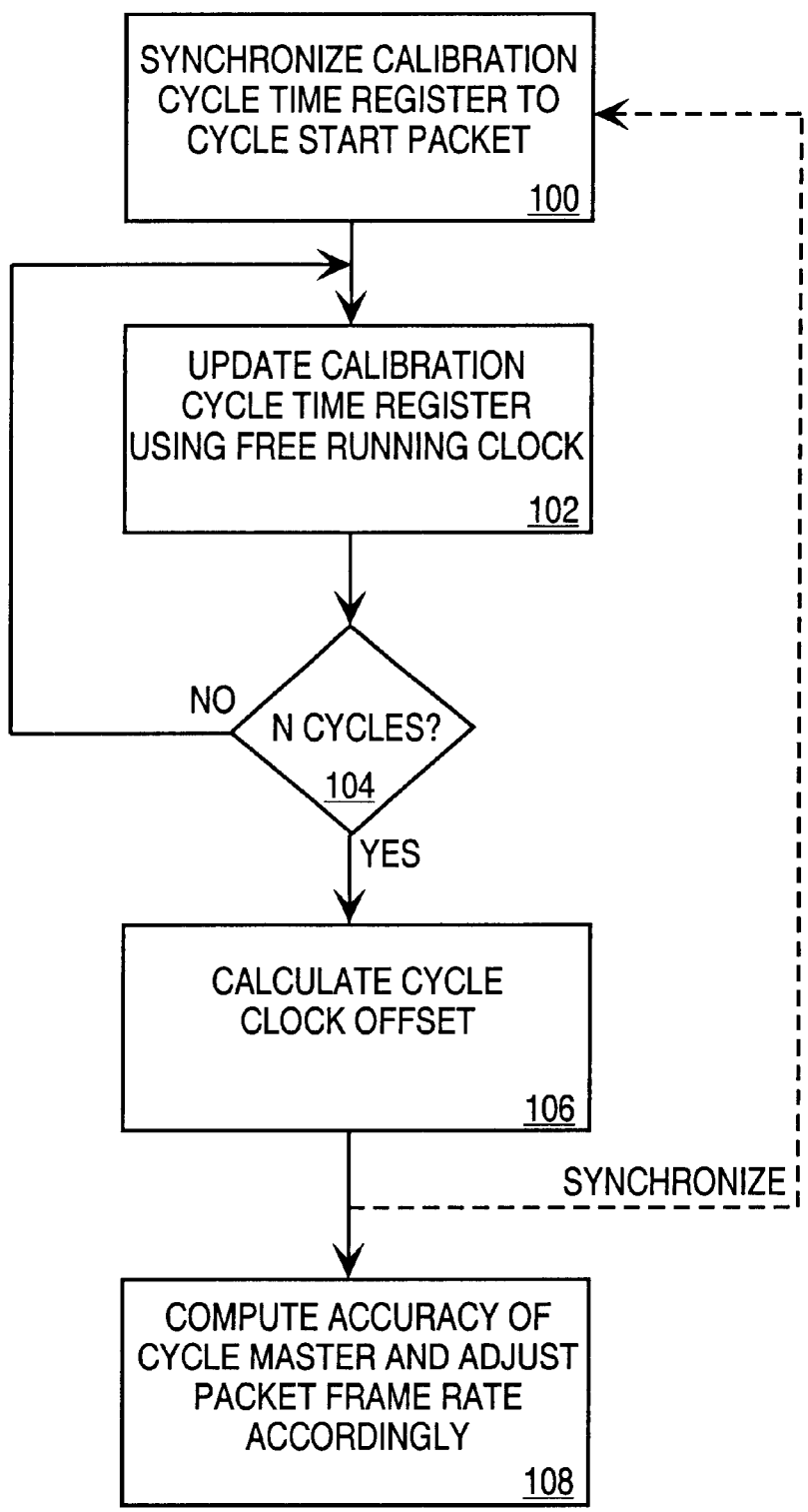
FIG. 2 is a flow diagram which summarizes a process for calibrating a cycle master in a digital network according to one embodiment of the present invention.

Thus a scheme for controlling isochronous data communications within a digital system having a bus architecture that complies with the IEEE-1394 Standard for a High Performance Serial Bus has been described. The process is summarized in FIG. 2 as follows. At step 100, the calibration cycle time register of the host controller is synchronized to a first cycle start packet received from a cycle master. At step 102, the host adapter's calibration cycle time register is updated using the free running clock of the host adapter (e.g., the 24.576 MHz clock that is used to update the cycle time register). This process is repeated (step 104) for a large number "n" of cycles (e.g., 8000 cycles), each cycle being measured by the receipt of a cycle start packet from the cycle master. Then, at step 106, after the $n^{th}$ cycle, before synchronizing the calibration cycle time register and the cycle time register to the time in the cycle start packet received from the cycle master, the cycle clock offset is measured as the difference between the value stored in the host adapter's cycle time register and the value from the calibration cycle time register. From this offset, the accuracy of the cycle master's cycle timer is computed (e.g., in ppm) and the packet frame rate adjusted accordingly to achieve a desired frame rate (step 108). In the foregoing specification, the invention has been described with reference to specific exemplary embodiments thereof. It will, however, be appreciated by those skilled in the art that various modifications and changes may be made thereto without departing from the broader spirit and scope of the invention as set forth in the appended claims. The specification and drawings are accordingly, to be regarded in an illustrative rather than a restrictive sense.

What is claimed is:

1. A method for calibrating a timer in a digital network, comprising:

computing a clock offset that represents a difference between a first time synchronized to each of a plurality of packet arrival events and a second time synchronized not to each but to every K of said plurality of packet arrival events, where K is a positive integer greater than one; and adjusting a data transmission rate in said digital network to compensate for said clock offset.

2. The method of claim 1 wherein the computing of a clock offset comprises computing a difference between a cycle time register value and a calibration cycle time register value of a node in the digital network.

3. A method comprising:

measuring an accuracy of a cycle timer in a digital network by measuring a cycle clock offset between a cycle clock of the cycle timer and a cycle clock of a host adapter in the network; and adjusting a rate of data transmitted within the digital network according to the measured accuracy.

4. The method of claim 3 wherein the digital network comprises a network that is in accordance with the IEEE-1394 Standard.

5. The method of claim 4 wherein said data transmitted within the digital network according to the adjusted accuracy is video data.

6. The method of claim 3 wherein a reference time of the cycle clock of the host adapter is maintained in a calibration cycle time register.

7. A system comprising:

means for synchronizing a first timer to each of a plurality of packet arrival events;

means for synchronizing a second timer not to each one but to every K of said plurality of packet arrival events, where K is a positive integer greater than one;

means for computing an offset between the first timer and the second timer; and means for adjusting a rate of data transmission to compensate for said offset.

8. The system of claim 7 wherein each of the packet arrival events is derived from a respective cycle start packet for an isochronous cycle.

9. The system of claim 7 further comprising:

means for displaying video data in accordance with a timing derived from presentation time stamp values in a plurality of received packets, each of the plurality of received packets being part of a separate received frame of video data.

10. A system comprising:

a transmitting device having a first timer;

a receiving device having a second timer and a third timer; and a point-to-point bus to be used by the transmitting and receiving devices for communication, the transmitting device to transmit a plurality of packets into the point-to-point bus, each packet having a time stamp from the first timer, the receiving device to receive each of the plurality of packets and synchronize (1) said second timer in accordance with the time stamp in each of the plurality of packets, and (2) said third timer in accordance with the time stamp that is not in each one but in every K of the plurality of packets, where K is a positive integer greater than one, the receiving device to compute a difference between the second timer and the third timer and then cause a data transmission rate to be adjusted to compensate for the difference.

11. The system of claim 10 wherein each of the packets is a respective start packet in a respective frame of data.

12. The system of claim 11 wherein the transmitting device is a video camera and the receiving device is a display monitor.

13. The system of claim 10 wherein the transmitting device includes a cycle master, the receiving device includes a host controller, and the point-to-point bus is according to the IEEE-1394 Standard.

14. The system of claim 10 wherein the first timer includes a first cycle time register, the second timer includes a second cycle time register, and the third timer includes a calibration cycle time register, all being updated according to essentially the same free-running clock frequency, and wherein the difference is computed prior to loading the second cycle time register and the calibration cycle time register with the time stamp of every $K^{th}$ received packet.

15. A method for adjusting the timing of the transmission of data in a digital system, comprising:

measuring an inaccuracy of time that is indicated by a plurality of cycle start packets broadcast by a cycle master associated with a node on a serial bus; and adjusting a timing of data transmission on the serial bus to compensate for the measured inaccuracy, wherein said data transmission timing is also based on the time indicated by said plurality of cycle start packets.

16. The method of claim 15 wherein the inaccuracy is measured by obtaining an offset between first and second registers that are written to in accordance with the same free-running clock, wherein the first register is synchronized to every one of said plurality of cycle start packets and the second register is synchronized not to every one but to every $K^{th}$ one of the plurality of cycle start packets.

17. The method of claim 15 wherein the timing is adjusted by adjusting the number of data packets in each of a plurality of frames to be transmitted.

18. A method comprising:

broadcasting a plurality of packets by a first node on a serial bus, each of the packets having a time stamp, from a timer of the first node, to be used by a node on the serial bus for isochronous access to the serial bus;

measuring at a second node on the serial bus an accuracy of the timer of the first node; and adjusting a rate of data transmission on the bus in accordance with the measured accuracy.

19. The method of claim 18 the accuracy is measured by determining an offset between a first timer and a second timer of the second node, the first and second timers being clocked by the same reference clock signal, the first timer being synchronized to the time stamp in all of the plurality of packets, the second timer being synchronized to the time stamp in fewer ones of said plurality of packets.

20. The method of claim 18 wherein the rate of data transmission is adjusted by setting the number of packets to be transmitted in each frame of data.

21. An article of manufacture comprising:

a machine-readable medium having code that can program a device to (a) recognize a respective time value in each one of a plurality of packets received over a bus and adjust a first timer and a second timer of the device, the first timer to be adjusted in accordance with the time values indicated in all of the plurality of received packets, the second timer to be adjusted in accordance with the time values indicated in fewer ones of the plurality of received packets, (b) compare the first and second timers prior to adjusting the second timer, and (c) cause a rate of data transmission to be adjusted based on the comparison.

22. The article of manufacture of claim 21 wherein said code can program a device that is a video display device.

23. The article of manufacture of claim 22 wherein the medium has further code that can program the device to process a video stream, comprising a plurality of frames, received over the bus according to a data transmission rate that has been adjusted based on the comparison.

* * * * *